US011137508B2

(12) United States Patent
Zheng et al.

(10) Patent No.: US 11,137,508 B2
(45) Date of Patent: *Oct. 5, 2021

(54) MONITORING SYSTEM FOR DEFORMATIONS OF GAS STORAGE

(71) Applicant: Research Institute of Petroleum Exploration & Development, PetroChina Company Limited, Beijing (CN)

(72) Inventors: Dewen Zheng, Beijing (CN); Zhide Wu, Beijing (CN); Guosheng Ding, Beijing (CN); Huayin Zhu, Beijing (CN); Jianfeng Liu, Beijing (CN); Lina Ran, Beijing (CN); Tong Lin, Beijing (CN)

(73) Assignee: RESEARCH INSTITUTE OF PETROLEUM EXPLORATION & DEVELOPMENT, PETROCHINA COMPANY LIMITED, Beijing (CN)

( * ) Notice: Subject to any disclaimer, the term of this patent is extended or adjusted under 35 U.S.C. 154(b) by 546 days.

This patent is subject to a terminal disclaimer.

(21) Appl. No.: 16/102,774

(22) Filed: Aug. 14, 2018

(65) Prior Publication Data
US 2019/0011581 A1 Jan. 10, 2019

(30) Foreign Application Priority Data
Jun. 14, 2017 (CN) .......................... 201710447226X

(51) Int. Cl.
G01V 1/00 (2006.01)
G01V 1/16 (2006.01)

(52) U.S. Cl.
CPC ........ *G01V 1/166* (2013.01); *G01V 2210/123* (2013.01); *G01V 2210/1232* (2013.01); *G01V 2210/1429* (2013.01)

(58) Field of Classification Search
USPC .......................................................... 367/14
See application file for complete search history.

(56) References Cited

U.S. PATENT DOCUMENTS 7,187,620 B2 * 3/2007 Nutt .......................... G01V 1/40
166/66
7,616,114 B2 * 11/2009 Tonelli ................... G01V 1/186
340/545.4

(Continued)

*Primary Examiner* — James R Hulka
(74) *Attorney, Agent, or Firm* — Bayramoglu Law Offices LLC

(57) ABSTRACT

The present invention describes a mechanical coupling microseismic monitoring system, which includes at least one microseismic sensor, push rods that are arranged at both ends of the microseismic sensor through a first connection mechanism to send the microseismic sensor into the monitoring hole, introduction mechanisms that are mounted on the push rods for introducing the microseismic sensor into the monitoring hole, and one microseismic monitoring computer that receives signals from the microseismic sensor; the microseismic sensor is a recoverable microseismic sensor; the first connection mechanism is a connection mechanism that can make the push rod swing relative to the microseismic sensor; the introduction mechanism is a three-roller introduction mechanism. The present invention meets the requirement of microseismic monitoring for different parts of deep monitoring hole using multiple microseismic sensors.

16 Claims, 4 Drawing Sheets

(56) References Cited

U.S. PATENT DOCUMENTS

| | | | | |
|---|---|---|---|---|
| 9,016,360 | B2* | 4/2015 | Cheon | G01V 1/008 166/66 |
| 10,267,140 | B2* | 4/2019 | Andreychuk | E21B 47/002 |
| 2003/0179651 | A1* | 9/2003 | Nutt | G01V 1/40 367/25 |
| 2008/0006474 | A1* | 1/2008 | Tonelli | G01V 1/186 181/122 |
| 2016/0356145 | A1* | 12/2016 | Andreychuk | E21B 47/002 |
| 2018/0364379 | A1* | 12/2018 | Liu | G01V 1/181 |

* cited by examiner

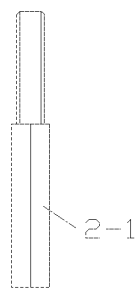  
Figure 9-1 Figure 9-2 Figure 9-3
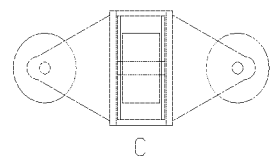 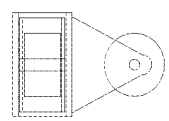 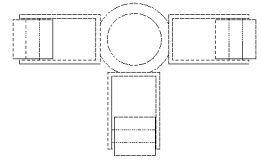
Figure 10-1 Figure 10-2 Figure 10-3

MONITORING SYSTEM FOR DEFORMATIONS OF GAS STORAGE

CROSS REFERENCE TO RELATED APPLICATIONS

This application is based upon and claims priority to Chinese Patent Application No. 201710447226X, filed on Jun. 14, 2017, the entire contents of which are incorporated herein by reference.

TECHNICAL FIELD

The present invention relates to the technical field of microseismic monitoring in engineering geology, and specifically relates to a system using microseismic sensors for microseismic monitoring.

BACKGROUND

In construction engineering, rock (rock mass) deformation and failure, especially rock burst dynamic disaster, would directly endanger the safety of construction engineering and even cause catastrophic consequences. Therefore, one of the important contents of construction engineering safety is the effective monitoring and prediction of rock (rock mass) stability and rock burst dynamic disaster. As an important means of non-destructive monitoring, a microseismic monitoring system is used to monitor and predict rock stability and rock burst dynamic disaster.

In the construction of surrounding rock excavation in an underground project, microseismic monitoring sensors need to be arranged in advance in the monitored surrounding rock area before the project is excavated in order to accurately predict the possible deformation and destruction of surrounding rock and dynamic disaster. The microseismic technology is used to accurately determine the locations where the surrounding rock deformation and dynamic disaster may occur. Microseismic sensors need to be distributed around the monitored rock in a three-dimensional spatial distribution. The more sensors are arranged, and the more rational the distribution is, the more accurate the monitoring results are. In order to realize the real-time monitoring of rock excavation process, it is necessary to use a drilling rig to drill a monitoring hole in the rock (rock mass) and install a microseismic sensor in the monitoring hole before the excavation of the rock (rock mass). The depth of the monitoring hole depends on the buried depth of the excavation and the range of monitoring. The depth of the monitoring hole increases with the increase of buried depth of the excavation and the range of monitoring. Some monitoring holes have a depth of tens of meters or even hundreds of meters. For the monitoring hole with a large depth, it is usually necessary to use multiple microseismic sensors to perform microseismic monitoring on different parts of the monitoring hole. The deeper the monitoring hole is, the more microseismic sensors need to be installed. Additionally, it is difficult to ensure the concentricity between the upper and lower monitoring holes and to keep the hole wall surface smooth, therefore the installation of the microseismic sensors is more difficult.

In the on-site installation of the microseismic monitoring sensor in a project, the microseismic sensor is usually placed directly in the monitoring hole, and the residual water in the monitoring hole is used as a medium for signal transmission between the rock and the sensor. However, this method has the following disadvantages: First, the direction of the monitoring hole must be downward and the method is not suitable for monitoring holes that are completely horizontal or upward with a certain angle. Secondly, for oblique or downward monitoring holes, the rock needs to be relatively intact, so that the monitoring hole can hold the injected water and prevent draining along the cracks in the monitoring hole or prevent seeping from the inside of the monitoring hole, therefore the sensor must always be submerged in water. But it is difficult to meet these requirements in actual field conditions. Third, although water can be used as a coupling medium for signal transmission, the density of water is relatively low and its transmission effect is not as good as transmission of the sensor directly and effectively contacting the rock wall. Fourth, as the liquid can only transmit longitudinal waves but not transverse waves, determination of the location of the rock-burst signal on the site usually depends on the transverse wave signal, so this method results in a loss of a large number of monitoring signals and the reliability of the monitoring results is greatly reduced.

In order to ensure an effective coupling between the monitoring hole wall and the microseismic sensor in the monitoring hole, cement slurry is poured into the monitoring hole at the construction site, so that the sensor and the rock wall are casted as a whole. This method has the following disadvantages: First, if no signal or a poor signal is achieved by the sensor after pouring the cement slurry, the inspection cannot be performed. In order to ensure a good monitoring effect, it is necessary to re-drill a hole and install a new microseismic sensor, which is not only time-consuming and laborious, but also leads to high economic costs. Second, when the cement slurry is poured into the monitoring hole, due to the depth of the monitoring hole, it is difficult to guarantee the grouting effect at the sensor installation site. Failure of the effective grouting at the sensor installation site may also occur. This failure will result in the sensor not coupling with the monitoring hole wall and therefore no monitoring signal is recorded. And the deeper the monitoring hole is, the greater the total shrinkage deformation of the poured cement slurry after solidification is. Meanwhile the signal transmission cable cemented with the cement slurry will bear tension due to shrinkage deformation of the cement and this will lead to failure of the effective transmission of the signal. Third, as the monitoring hole is usually relatively moist, the cement slurry needs a longer period of solidification after pouring. This leads to a longer construction period. Fourth, the explosives blasting in the excavation process may loosen the grouting surface and the rock wall surface, which in turn leads to the reduction of the effectiveness of the monitored signal transmission. Fifth, the installation process is time-consuming and laborious, which requires a series of professional grouting equipment and grouting personnel and a lot of labor.

A simple fixed device is also used in engineering applications, which fixes the microseismic sensor in a specific device, and then sends the microseismic sensor to a mounting site with a non-movable rigid metal rod to perform fixation. However, this method has the following disadvantages: First, this method is usually suitable for the monitoring holes of shallow depth and requires that the monitoring holes are completely concentric and the respective hole walls are smooth. These requirements are difficult to guarantee in actual construction. Second, the installation device is large in size, only suitable for large diameter monitoring holes, which leads to a high drilling cost. Third, the entire transmission rod and the mounting structure are rigidly inserted into the monitoring hole by applying force. This process not only has high frictional force, which easily wears down the cable or the microseismic sensor, but it can easily get stuck in the monitoring hole at a specific location. This in turn makes it impossible to send the transmission rod and mounting structure to a specific mounting location. Fourth, the installation process is time-consuming and laborious, which requires a lot of labor. As a result of the above problems, the application of microseismic sensors in deep monitoring holes is limited.

Therefore, how to install the microseismic sensors in the monitoring hole conveniently and effectively along with how to accurately couple the installed microseismic sensors to the hole wall is still a difficult problem in the on-site monitoring and research, especially considering the deep monitoring holes which need to be monitored by multiple microseismic sensors for microseismic monitoring in different areas.

SUMMARY

In view of the current status and insufficiency of the microseismic monitoring technology in the prior art, the present invention aims to provide a microseismic monitoring system with good contact coupling and easy installation of the microseismic sensor in the monitoring hole in order to improve the accuracy of microseismic monitoring and reduce the projected cost of the microseismic monitoring system.

The mechanical coupling microseismic monitoring system provided by the present invention includes at least one microseismic sensor, push rods that are arranged at both ends of the microseismic sensor through a first connection mechanism to send the microseismic sensor into a monitoring hole, introduction mechanisms that are installed on the push rods for introducing the microseismic sensor into the monitoring hole, and microseismic monitoring computer that receive signals from the microseismic sensor. The microseismic sensor includes a microseismic probe, a holding component which holds the microseismic probe, a supporting plate that is supported by a wall surface of the monitoring hole, and a second connection mechanism for connecting the holding component with the supporting plate; the holding component is configured to contact and couple with a lower surface of the microseismic probe held by the holding component with the wall surface of the monitoring hole where the microseismic probe is located. A supporting side panel of the supporting plate is an arc panel. The second connection mechanism includes at least two spring sleeves arranged on the holding component longitudinally along the microseismic probe, spring guide rods that are arranged on a non-supporting side panel of the support plate and matched with the spring sleeves arranged on the holding component, telescopic springs that are located inside the spring sleeves and are sleeved around the spring guide rods and act on the bottom of the spring sleeves, and bolts that pass vertically through the spring sleeve walls and the spring guide rods. The microseismic sensor is placed on a monitoring hole and the bolts are pulled out in the monitoring hole, then the lower surface of the microseismic probe and the arc supporting side panel of the supporting plate are effectively coupled with an inner wall of the monitoring hole under the action of the telescopic springs to monitor a vibration of rocks. Connection mechanisms are configured to make push rods swing relative to the microseismic sensor. The introduction mechanism is a roller introduction mechanism.

In order to better solve the technical problems to be solved by the prevent invention, the following technical measures are further taken. The following technical measures are taken individually or in combination.

The holding component is preferred to adopt a probe sleeve including a cone head and a straight body with an open structure. A shape and structure of an inner cavity of the probe sleeve matches a shape and structure of the microseismic probe, so that a lower surface of the microprobe probe in the probe sleeve and a tip of the microprobe probe are exposed.

The spring sleeves preferably arranged perpendicular to the probe sleeves and fixed on both sides of the probe sleeve, and 2-3 spring sleeves are arranged on each side. Further, the spring sleeves are preferably fixed on both sides of the probe sleeve in a way that is perpendicular and symmetrical to the axis of the microseismic probe. All the spring sleeves, the spring guide rods and the telescopic springs that make up the connection mechanism have the same structure.

The tail end of the probe sleeve is provided with an end cap connected with the sleeve body through a screw pair, and the microseismic probe is fixed in the sleeve cavity through the end cap.

The bolts in all parts of the second connection mechanism are components to be an integral structure, that is, a pin rod passes vertically through all the spring sleeves walls and the spring guide rods to function as the bolts at each part. Further, it is preferable that one end of the pin rod as the bolts at each parts is provided with a pull cord at the tail end of the microseismic probe for pulling out the pin rod.

In order to facilitate the installation of the telescopic spring in the spring sleeve, an upper spring seat of the telescopic spring is designed on the spring guide rod. The telescopic spring is installed in the spring sleeve by the upper spring seat. In the process of installing the microseismic sensor in the monitoring hole, the bolt passes through the spring guide rod by the bolt hole above the spring seat. The spring guide rod can also be designed with a mounting slot on the spring sleeve instead. The telescopic spring is installed in the spring sleeve through the mounting slot. In the process of installing the microseismic sensor in the monitoring hole, the bolt is used as the upper mounting seat of the telescopic spring.

The first connection mechanism includes a connecting frame, a threaded sleeve and a connecting rod. One end of the connecting frame is fixedly connected to one end of the microseismic sensor, and the other end of the connecting frame is hinged to the threaded sleeve by a hinge structure. One end of the connecting rod is processed with an external thread that is matched with the threaded sleeve, and the other end of the connecting rod is a polyhedral column. One end of the push rod connected with the first connection mechanism is processed with a polyhedral column hole matched with the polyhedral column of the connecting rod, and the other end of the push rod is processed with an extension connection structure, the polyhedral column hole of the push rod and the polyhedral column of the connecting rod constitute a multi-sided socket structure, and the polyhedral column of the connecting rod is fixed inside the polyhedral column hole of the push rod by fastening screws. The multi-sided socket structure is a four-sided socket structure, a six-sided socket structure or an eight-sided socket structure, and the six-sided socket structure is preferred. The extension connection structure of the push rod is a screw connection structure, a lap connection structure, a socket connection structure, etc., as long as it can be matched with the extension connection component to form the connection pair. Further, the connecting frame in the connection mechanism is designed to be composed of a ring that matches with the microseismic sensor, a connector, and two connecting arms of folding structures. The two connecting arms are arranged symmetrically, as one end is fixedly connected to the ring and the other end is connected with the connector. The connecting frame is hinged to the threaded sleeve by the connector so that the push rod can swing relative to the microseismic sensor.

The introduction mechanism is a three-roller introduction mechanism. The three rollers of the three-roller mechanism are configured to move along the wall of the monitoring hole in two mutually perpendicular directions, one of the three rollers is arranged opposite of the supporting plate in the microseismic sensor, and the other two rollers are arranged to be opposite to each other.

The microseismic monitoring system provided by the present invention is used for microseismic monitoring. When the monitoring holes are deep, a plurality of microseismic sensors are used for microseismic monitoring in different directions of the monitoring holes. By the extension connection structure at the tail end of the push rod, the microseismic sensors can be connected with an extension rod to form a monitoring system to meet extension requirements.

The mechanical coupling microseismic monitoring system provided by the present invention solves the problems of installation and effective coupling of a plurality of microseismic sensors, which is suitable for monitoring holes with large depths that require multiple microseismic sensors to monitor microseisms in different parts. The outstanding features are as follows: First, the installation of the microseismic sensor is not only simple and easy, which saves a lot of manpower, but also overcomes the adverse effects of the monitoring hole due to different depths and directions. Second, not only can microseismic sensors be inspected during the testing process, but the microseismic sensors can be recycled for reuse, thereby reducing the cost of application. Third, a plurality of microseismic sensors can be arranged in the same monitoring hole as needed and the ingenious design of the first connection mechanism can make the direction of the effective monitoring surface of each microseismic sensor separately determined during the installation process to meet the monitoring needs. Fourth, the ingenious design of the second connection mechanism ensures that the microseismic sensor can effectively couple with the wall of the monitoring hole under adverse conditions such as rock destruction or decentraction of monitoring holes caused by large depths. Fifth, the rolling transmission is realized in the installation process, which overcomes the effect of friction and ensures the integrity of the sensor and the transmission cable. Sixth, the supporting plate is designed as an arc coupling surface, which ensures the coupling effect and the monitoring reliability.

The mechanical coupling microseismic monitoring system provided by the present invention is especially suitable for the deep holes which require a plurality of microseismic sensors to monitor microseisms at different depths.

BRIEF DESCRIPTION OF THE DRAWINGS

FIGS. 7-1 and 7-2 are the schematic diagrams of the connection structure between the push rod and the microseismic sensor; wherein FIG. 7-1 is the schematic diagram of the front view of the connection structure; and FIG. 7-2 is the schematic diagram of the top view of the connection structure.

FIGS. 8-1, 8-2 and 8-3 are the schematic diagrams of the push rod; wherein FIG. 8-1 is the schematic diagram of the front view; FIG. 8-2 is the schematic diagram of the left view; and FIG. 8-3 is the schematic diagram of the top view.

FIGS. 9-1, 9-2 and 9-3 are the schematic diagrams of the connecting rod, wherein FIG. 9-1 is the schematic diagram of the front view; FIG. 9-2 is the schematic diagram of the left view; and the FIG. 9-3 is the schematic diagram of the top view.

FIGS. 10-1, 10-2, and 10-3 are the schematic diagrams of the introduction mechanism, wherein FIG. 10-1 is the schematic diagram of the C direction of the introduction mechanism in FIG. 1; FIG. 10-2 is the schematic diagram of the left view of the introduction mechanism in FIG. 10-1; FIG. 10-3 is the schematic diagram of the top view of the introduction mechanism in FIG. 10-1.

In the above drawings, 1 is microseismic sensor, 2 is push rod, 3 is introduction mechanism, and 4 is monitoring computer. Wherein, 1-1 is microseismic probe; 1-2 is end cap; 1-3 is supporting plate; 1-4 is telescopic spring; the 1-5 is spring guide rod; 1-6 is spring sleeve; 1-7 is probe sleeve; 1-8 is pin rod; 1-9 is pull cord; 1-10 is connecting frame; 1-11 is threaded sleeve; 2-1 is connecting rod; 2-2 is push rod body; 2-3 is fastening screw.

DETAILED DESCRIPTION OF THE EMBODIMENTS

The embodiments of the present invention are illustrated with the accompanying drawings, and the mechanical coupling microseismic monitoring system described in the present invention is further described by the embodiments.

Figure 1:
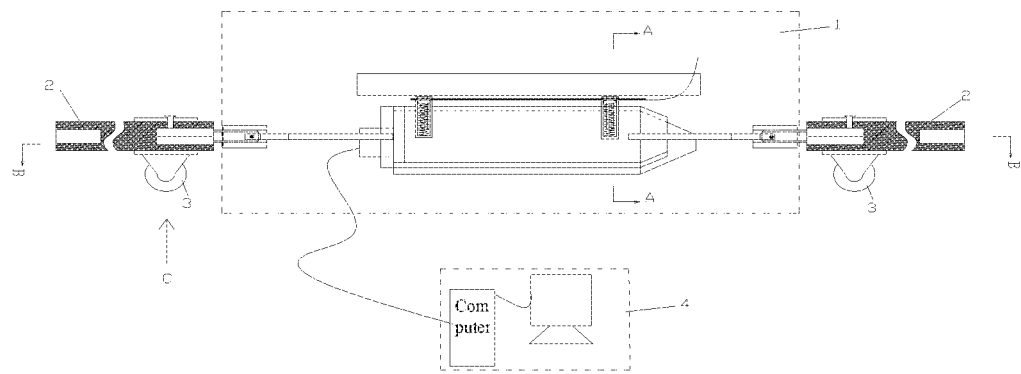
FIG. 1 is a schematic diagram of a front view of the microseismic detection system in the present invention.
Figure 2:
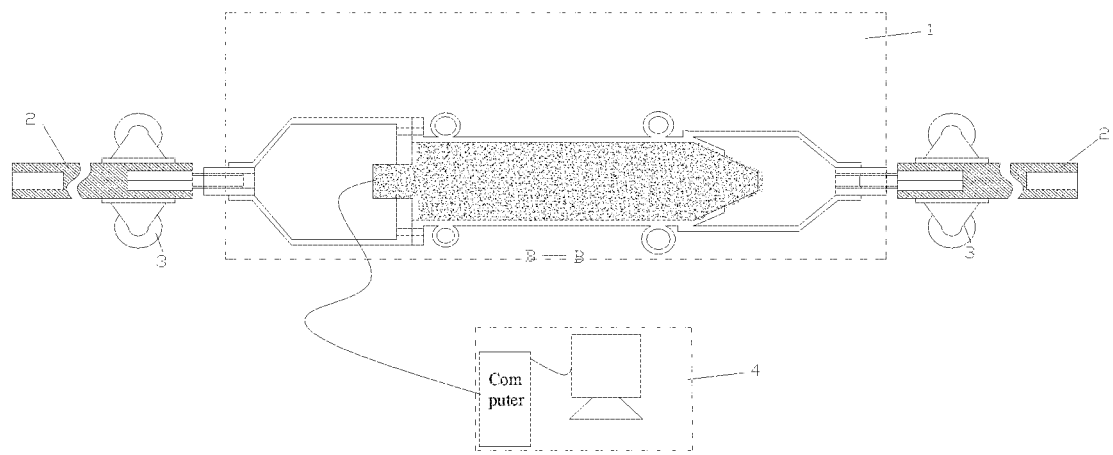
FIG. 2 is a schematic diagram of the B-B direction (top view) in FIG. 1.
Figure 3:
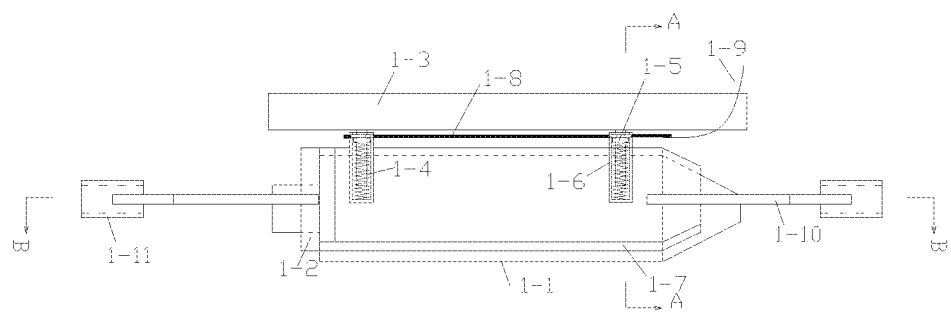
FIG. 3 is a schematic diagram of an enlarged view of part 1 (the microseismic sensor) in FIG. 1.
Figure 4:
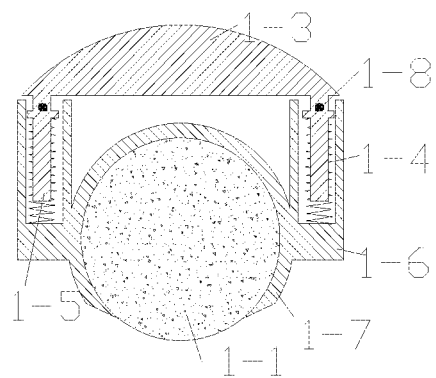
FIG. 4 is a schematic diagram of the A-A direction in FIG. 1.
Figure 5:
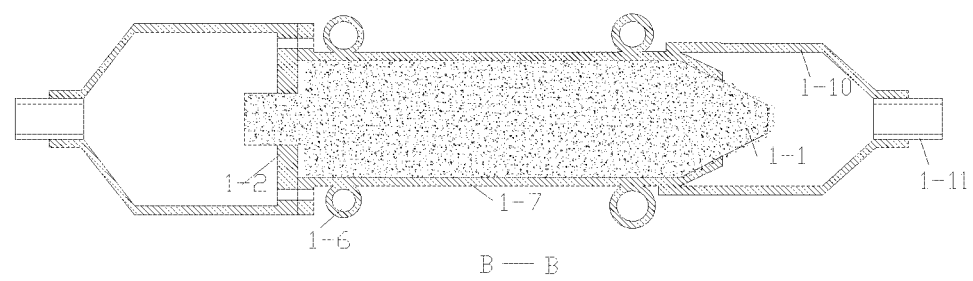
FIG. 5 is a schematic diagram of part 1 (top view) in FIG. 2.
Figure 6:
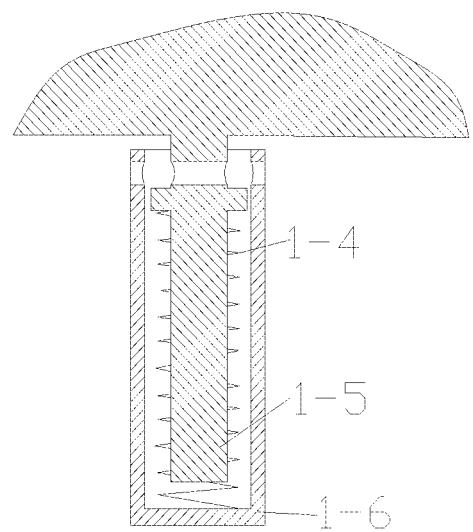
FIG. 6 is a schematic diagram of the assembly of the telescopic spring in the microseismic sensor.
Figures 1, 7:
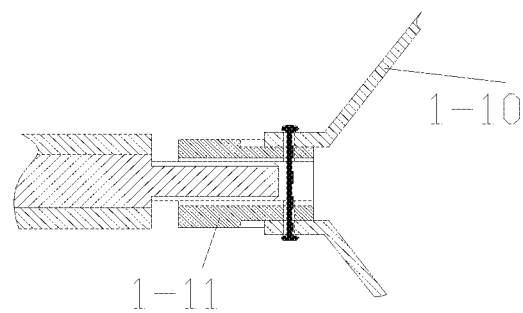
Figures 2, 7:
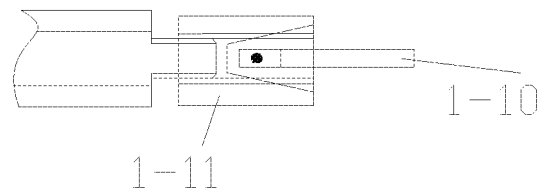
Figures 1, 2, 3, 8:
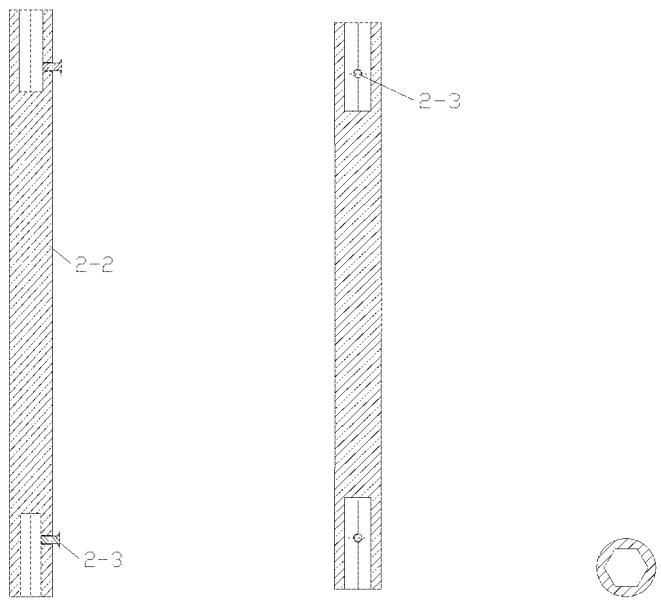

The mechanical coupling microseismic monitoring system of the present embodiment, as shown in FIG. 1 to FIG. 10-3, includes one microseismic sensor 1, push rods 2 that are arranged at both ends of the microseismic sensor through a first connection mechanism to send the microseismic sensor into the monitoring hole, introduction mechanisms 3 that are mounted on the push rods for introducing the microseismic sensor into the monitoring hole, microseismic monitoring computer 4 that receives signals from the microseismic sensor. The microseismic sensor is a recoverable microseismic sensor, which includes a microseismic probe 1-1, a probe sleeve 1-7 holding the microseismic probe, an end cap 1-2 that fixes the microseismic probe in the probe sleeve, a supporting plate 1-3 that is supported by the wall surface of the monitoring hole, and a second connection mechanism for connecting the probe sleeve with the supporting plate; the probe sleeve includes a cone head and a straight body with an open structure, and a shape and structure of an inner cavity of the probe sleeve matches a shape and structure of the microseismic probe, so that a lower surface of the microseismic probe in the probe sleeve and a tip of the microprobe probe are exposed, the lower surface of the microseismic probe in the probe sleeve contact and couple with the wall of monitoring hole; a supporting side panel of the supporting plate is an arc panel; the second connection mechanism includes spring sleeves 1-6 that are arranged at both sides of the probe sleeve in a way that is perpendicular and symmetrical to the axis of the microseismic probe and two on each side of the probe sleeve, spring guide rods 1-5 that are arranged on the non-supporting side panel of the support plate and matched with the spring sleeve arranged on the probe sleeve, telescopic springs 1-4 that are located inside the spring sleeves and sleeved around the spring guide rods and act on a bottom of the spring sleeve, and bolts that pass vertically through the spring sleeve walls and the spring guide rods. The bolts in all parts of the second connection mechanism are components to be an integral structures, that is, a pin rod 1-8 passes vertically through all the spring sleeves walls and the spring guide rods to be the bolts at each part, and one end of the pin rod as the bolts at each parts is provided with a pull cord 1-9 at the tail end of the microseismic probe for pulling out the pin rod. One end of the push rod 2 connected with the connection mechanism is processed with a first hexagonal column hole, the other end is processed with a second hexagonal column hole that is connected to the extension rod. The connection mechanism includes a connecting frame 1-10, a threaded sleeve 1-11 and a connecting rod 2-1, wherein the connecting frame includes a ring that is fixedly connected to the microseismic sensor, a connector and two connecting arms with folding structures, and the two connecting arms are arranged symmetrically, one end is fixedly connected to the ring and the other end is connected with the connector, and the connecting frame is hinged to the threaded sleeve by the connector. One end of the connecting rod is processed with an external thread matched with the threaded sleeve, and the other end is a hexagonal column socketed with the polyhedral column hole of the push rod, and the hexagonal column of the connecting rod is fixed in the hexagonal column hole of the push rod by fastening screws. The introduction mechanism 3 is a three-roller introduction mechanism. The three rollers of the three-roller mechanism are set to move along the wall of the monitoring hole in two mutually perpendicular directions, wherein one of the three rollers is set to be opposite to the supporting plate 1-3 in the microseismic sensor, and the other two rollers are set to be opposite to each other.

Application method: First, embed the microseismic probe 1-1 into the probe sleeve 1-7, and fix the microseismic probe in the probe sleeve cavity by the end cap 1-2. Second, insert the spring guide rods with telescopic springs correspondingly into the spring sleeves 1-6 on both sides of the probe sleeve, pass the pin rod 1-8 vertically through the wall of the spring sleeve and the pin hole above the spring seat on the spring guide rod, so that the microseismic probe is integrally connected with the supporting plate; Then, install the push rod 2 at both ends of the microseismic sensor by the connection mechanism, install the three-roller introduction mechanism 3 on the push rod, connect the signal output end of the microseismic sensor with the signal input end of the monitoring computer, send the microseismic sensor into the monitoring hole by the push rod and the introduction mechanism installed on the push rod. After the microseismic sensor is in place, pull out the bolts by the wire pull cord at the tail end of the pin rod, then the lower surface of the microseismic probe and the arc supporting side panel of the supporting plate are effectively coupled with the inner wall of the monitoring hole under the action of the telescopic spring to monitor the vibration of the rock.

It is necessary to point out that the above embodiment is used only for further illustration of the present invention, which cannot be understood as a limit to the protection scope of the present invention. Those skilled in the art can make some non-essential improvements and adjustments to the present invention according to the content of the invention to achieve the specific implementation, which still belongs to the protection scope of the present invention.

What is claimed is:

1. A mechanical coupling microseismic monitoring system, comprising
    at least one microseismic sensor,
    push rods, wherein the push rods are arranged at both ends of the at least one microseismic sensor through a first connection mechanism to send the at least one microseismic sensor into a monitoring hole,
    introduction mechanisms, wherein the introduction mechanisms are installed on the push rods for introducing the at least one microseismic sensor into the monitoring hole, and
    a microseismic monitoring computer, wherein the microseismic computer receives signals from the at least one microseismic sensor;
    wherein the at least one microseismic sensor comprises a microseismic probe, a holding component, a supporting plate supported by a wall surface of the monitoring hole, and a second connection mechanism for connecting the holding component with the supporting plate;
    wherein the holding component is configured to contact and couple a lower surface of the microseismic probe with the wall surface of the monitoring hole where the microseismic probe is located;
    a supporting side panel of the supporting plate is an arc panel;
    the second connection mechanism comprises at least two spring sleeves, spring guide rods, telescopic springs, and bolts, wherein the at least two spring sleeves are arranged on the holding component longitudinally along the microseismic probe, the spring guide rods are arranged on a non-supporting side panel of the support plate and fit with the at least two spring sleeves arranged on the holding component, the telescopic springs are located inside the at least two spring sleeves and configured to sleeve the spring guide rods and act on bottoms of the at least two spring sleeves, and the bolts pass vertically through walls of the at least two spring sleeves and the spring guide rods;
    the at least one microseismic sensor is placed on the monitoring hole and the bolts are pulled out, then the lower surface of the microseismic probe and the supporting side panel of the supporting plate are effectively coupled with an inner wall of the monitoring hole by the telescopic springs;
    a first end of each push rod of the pin rods connected with the at least one microseismic sensor is provided with a connection structure, and a second end of the each push rod is provided with an extension connection structure;
    the first connection mechanism is configured for the each push rod to swing relative to the at least one microseismic sensor;
    each introduction mechanism of the introduction mechanisms is a roller introduction mechanism.

2. The mechanical coupling microseismic monitoring system of claim 1, wherein the holding component is a probe sleeve comprising a cone head and a straight body, and the straight body is with an open structure; the lower surface of the microseismic probe in the probe sleeve and a tip of the microseismic probe are exposed.

3. The mechanical coupling microseismic monitoring system of claim 2, wherein the at least two spring sleeves are fixed on both sides of the probe sleeve and perpendicular and symmetrical to an axis of the microseismic probe, and 2-3 spring sleeves are set on each side of the probe sleeve.

4. The mechanical coupling microseismic monitoring system of claim 3, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

5. The mechanical coupling microseismic monitoring system of claim 2, wherein a tail end of the probe sleeve is provided with an end cap connected with a sleeve body of the probe sleeve by a screw pair, and the microseismic probe is fixed in a sleeve cavity by the end cap.

6. The mechanical coupling microseismic monitoring system of claim 5, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

7. The mechanical coupling microseismic monitoring system of claim 2, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

8. The mechanical coupling microseismic monitoring system of claim 1, wherein each of the bolts is a pin rod, wherein the pin rod passes vertically through the walls of the at least two spring sleeves and the spring guide rods, and one end of the pin rod located at a tail end of the microseismic probe is provided with a pull cord for pulling out the pin rod.

9. The mechanical coupling microseismic monitoring system of claim 8, wherein each of the spring guide rods is designed with an upper spring seat for the telescopic springs, the bolts pass through the spring guide rods by a bolt hole above the upper spring seat.

10. The mechanical coupling microseismic monitoring system of claim 9, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

11. The mechanical coupling microseismic monitoring system of claim 8, wherein each of the at least two spring sleeves is provided with a mounting slot for installing the telescopic springs in the at least two spring sleeves; wherein when installing the at least one microseismic sensor in the monitoring hole, the bolts are used as an upper mounting seat of the telescopic springs.

12. The mechanical coupling microseismic monitoring system of claim 11, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

13. The mechanical coupling microseismic monitoring system of claim 8, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

14. The mechanical coupling microseismic monitoring system of claim 1, wherein the first connection mechanism comprises a connecting frame, a threaded sleeve, and a connecting rod, a first end of the connecting frame is fixedly connected to one end of the at least one microseismic sensor, and a second end of the connecting frame is hinged to the threaded sleeve by a hinge structure, wherein a first end of the connecting rod is provided with an external thread, the external thread fits with the threaded sleeve, and a second end of the connecting rod is a polyhedral column, the first end of the each push rod connected with the first connection mechanism is provided with a polyhedral column hole socketed with the polyhedral column of the connecting rod, and the second end of the each push rod is provided with the extension connection structure, the polyhedral column of the connecting rod is fixed in the polyhedral column hole of the each push rod.

15. The mechanical coupling microseismic monitoring system of claim 14, wherein the connecting frame comprises a ring fitting with the at least one microseismic sensor, a connector, and two connecting arms with folding structures; the two connecting arms are arranged symmetrically, first ends of the two connecting arms are is fixedly connected to the ring and second ends of the two connecting arms are connected with the connector; the connector is hinged to the threaded sleeve by the hinge structure so that the each push rod swings relative to the at least one microseismic sensor.

16. The mechanical coupling microseismic monitoring system of claim 14, wherein the each introduction mechanism is a three-roller introduction mechanism, three rollers of the three-roller mechanism are set to move along the wall surface of the monitoring hole in two mutually perpendicular directions, wherein one of the three rollers is set opposite to the supporting plate in the at least one microseismic sensor, and the other two rollers are set to be opposite to each other.

* * * * *